UNITED STATES PATENT OFFICE.

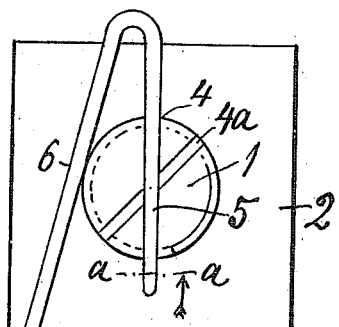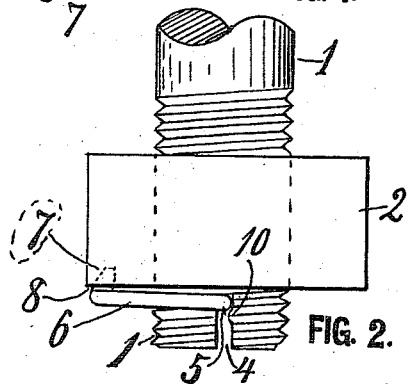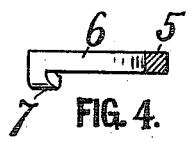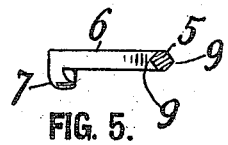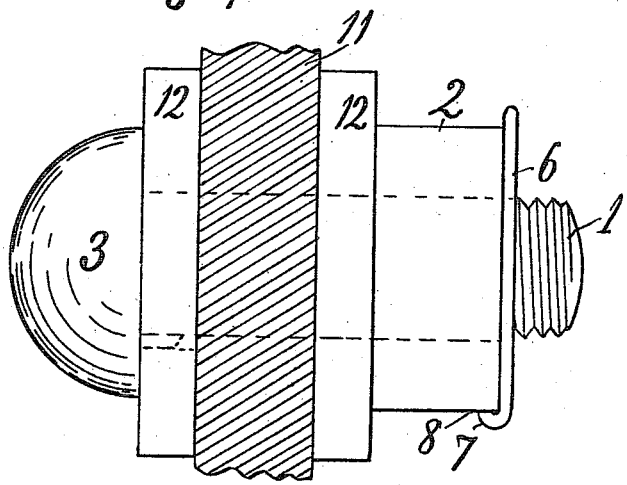

OTIS E. MOORE, OF CHISHOLM, MINNESOTA.

NUT-LOCK.

979,538.  Specification of Letters Patent.  Patented Dec. 27, 1910.

Application filed June 29, 1910. Serial No. 569,620.

*To all whom it may concern:*

Be it known that I, OTIS E. MOORE, a citizen of the United States, residing at Chisholm, in the county of St. Louis and State of Minnesota, have invented a new and useful Nut-Lock, of which the following is a specification.

My invention relates to nut locks; and the object is to provide a simple yet effective means for locking a nut to a bolt.

In the accompanying drawing, Figure 1 is an end view of a bolt with a nut held on it by my improved nut lock. Fig. 2 is a top view of the structure shown in Fig. 1. Fig. 3 is a sectional end view of the center web of a railway rail or other bar with adjacent fish-plates and a bolt passed therethrough and provided with a nut and my nut locking means applied thereto. Fig. 4 is a cross section of the locking pin on line $a$—$a$ Fig. 1. Fig. 5 is a modification of the form shown in Fig. 4.

Referring to the drawing by reference numerals, 1 designates a bolt having a nut 2, and a head 3, which in Fig. 3 is shown may be of the round form much in use for railway joints, but it is obvious that the head may be of any desired form.

The end of the bolt is provided with a diametrical slit 4, or it may have two slits like 4 and 4ª in Fig. 1. Down into said slit is driven a slightly tapered leg 5 of V-shaped steel staple 5—6, whose leg 6 has its end formed with a hook 7 adapted to be sprung by its arm 6 in over the edge 8 of the nut and prevent its accidental turning in the unscrewing direction.

Usually the nut in being tightened may be given the necessary fraction of a turn to bring one of its corners in locking position with the hook 7; still, to insure such locking position even where the nut is to be drawn very tight, I may provide the bolt with two slits, 4 and 4ª in Fig. 1, one slit being at an angle of about 45 degrees from the other slit so that when the nut is fairly tight, and the key 5—6 is inserted in the slit that is in the best position, the further turning of the nut to make it engage the hook 7 will not exceed 23 degrees on a square nut and will be much less than that on a hexagon nut.

In Fig. 5 is shown that the angular leg 5 may be twisted or otherwise formed in such position to the staple that its sharp edges 9 will cut into the sides of the slit in the bolt and in that way prevent the possibility of the key's working toward the end of the bolt. Another means for such prevention is to produce a bur, as 10 in Fig. 2 on the bolt near by the leg 5, said bur may be produced by a blow of a light hammer and preferably a punch or calking tool to strike on.

In Fig. 3 11 designates the center web of a railway rail having its sections jointed together by fish-plates 12, or 11 and 12 may represent any parts through which a bolt is passed and provided with a nut locked by my locking device.

What I claim is:—

1. In a nut lock, the combination with a bolt having in its threaded end a diametrical slit, a nut on the bolt, a staple-shaped key having one leg adapted to be driven into the said slit, its other leg being springy and provided with a hook adapted to engage and hold the nut against accidental unscrewing.

2. In a nut lock, the combination with a bolt having in its threaded end a diametrical slit, a nut on the bolt, a staple-shaped key having one leg adapted to be driven into the said slit, its other leg being springy and provided with a hook adapted to engage and hold the nut against accidental unscrewing; said driven leg having sharp ribs adapted to engage in the sides of the slit.

3. In a nut lock, the combination with a bolt having in its threaded end a diametrical slit, a nut on the bolt, a staple-shaped key having one leg adapted to be driven into the said slit, its other leg being springy and provided with a hook adapted to engage and hold the nut against accidental unscrewing; said slit being burred to prevent the driven leg from slipping toward the end of the bolt.

In testimony whereof I affix my signature, in presence of two witnesses.

OTIS E. MOORE.

Witnesses:
   GEO. K. TRASK,
   E. H. BARRETT.